(No Model.) 3 Sheets—Sheet 1.

I. KITSEE.
VOLTAIC BATTERY.

No. 400,225. Patented Mar. 26, 1889.

WITNESSES,
F. Norman Dixon,
Lewis Altmaier.

INVENTOR
Isidor Kitsee
By his Attorneys,
R. C. Swaniwick
& Bonsall Taylor

N. PETERS, Photo-Lithographer, Washington, D. C.

(No Model.) 3 Sheets—Sheet 2.
I. KITSEE.
VOLTAIC BATTERY.
No. 400,225. Patented Mar. 26, 1889.
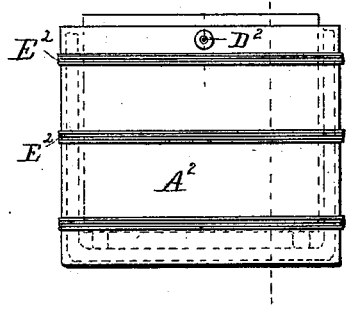
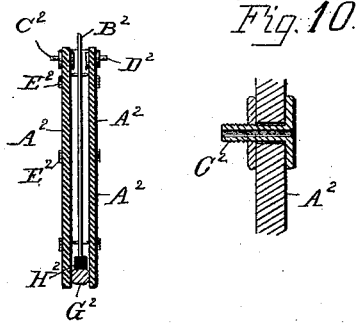
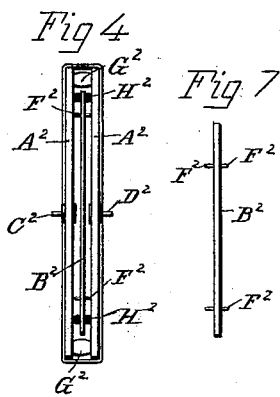
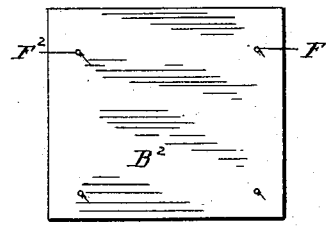
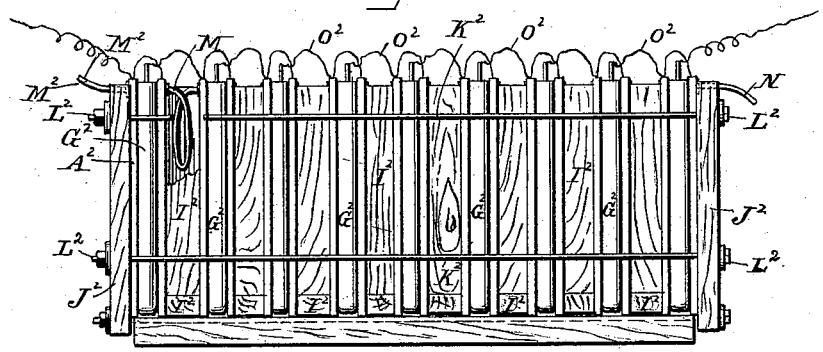
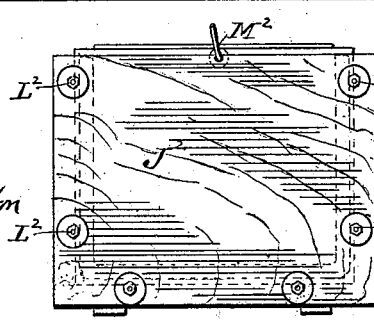
WITNESSES
F. Norman Dixon
Lewis Altmaier
INVENTOR
Isidor Kitsee
By his Attorneys
Bonsall Taylor

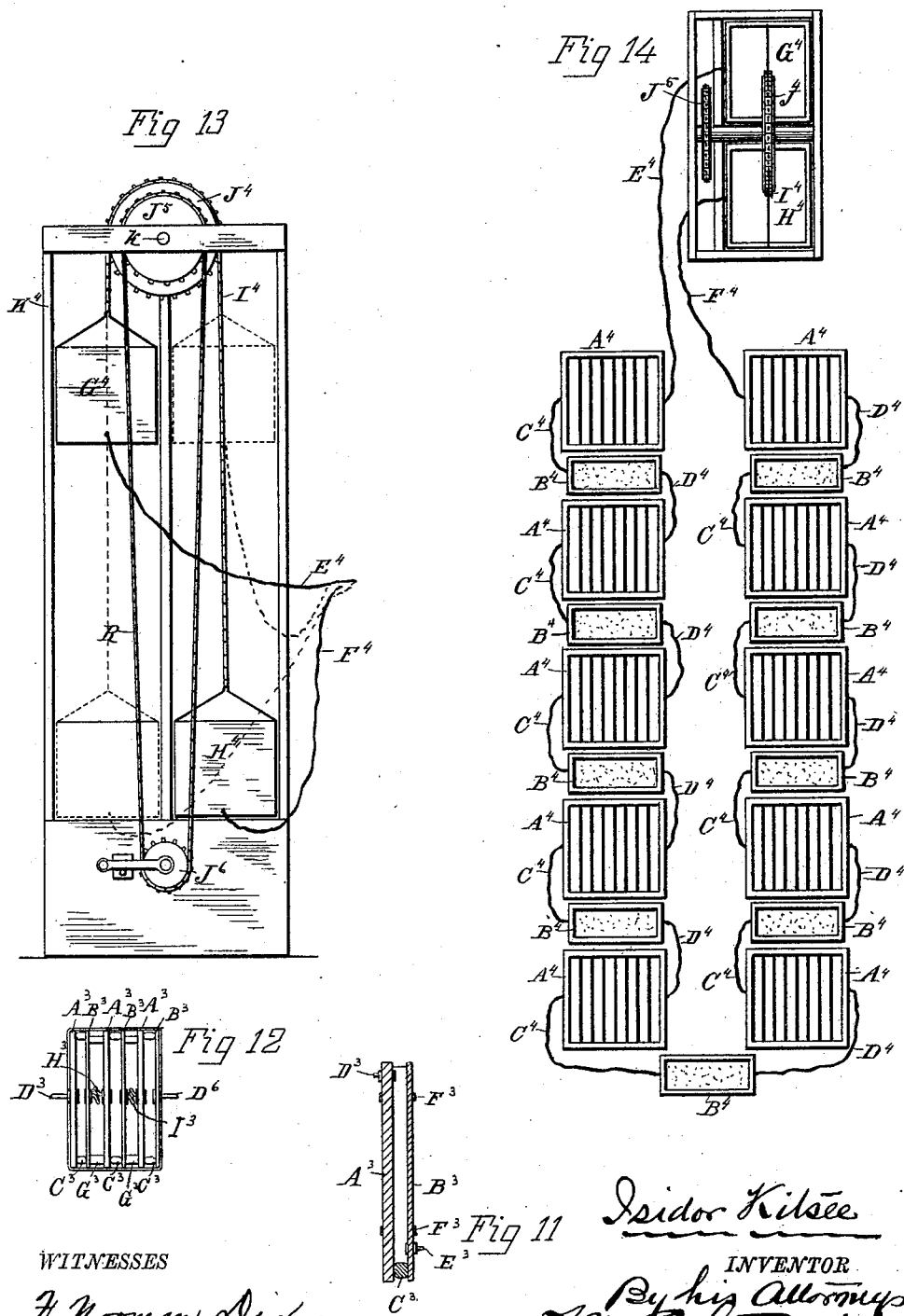

UNITED STATES PATENT OFFICE.

ISIDOR KITSEE, OF CINCINNATI, OHIO, ASSIGNOR TO MAYER SULZBERGER, TRUSTEE, OF PHILADELPHIA, PENNSYLVANIA.

VOLTAIC BATTERY.

SPECIFICATION forming part of Letters Patent No. 400,225, dated March 26, 1889.

Application filed April 19, 1888. Serial No. 271,211. (No model.)

*To all whom it may concern:*

Be it known that I, ISIDOR KITSEE, a citizen of the United States, residing at Cincinnati, in the State of Ohio, have invented an Improvement in Voltaic Batteries, of which the following is a specification.

The object of my invention is the construction of a voltaic battery which, when composed of a large number of couples will occupy less space, be of less weight, and be cheaper to make, than a battery composed of an equal number of cells but of ordinary construction; in which, when in action, the tendency of the negative element to become polarized will be prevented; in which both the negative and positive elements of the battery will, by the flow of the battery fluid, be kept clean; and in which the electro-motive force of the battery as an entirety will be nearly equal to the aggregate of the electro-motive force of all of the individual couples.

Figure 1:
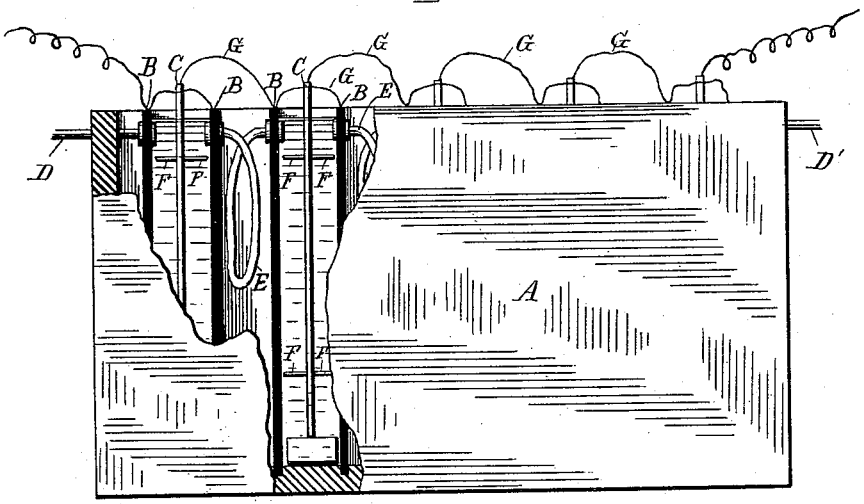
Figure 2:
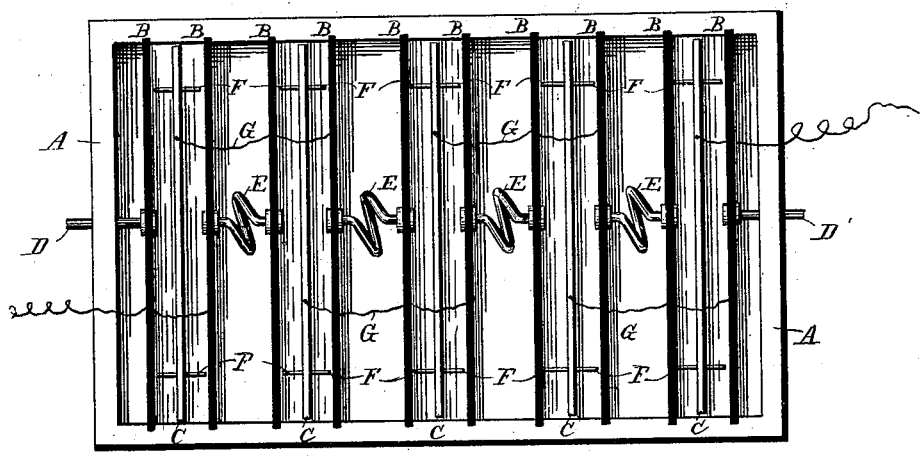

In the drawings, Figure 1 is a side elevation, partly sectional, of a multiple cell voltaic battery embodying my invention, and Fig. 2 a plan of the same. Fig. 3 is a sectional end elevation of a modified construction of a cell embodying my invention. Fig. 4 is a plan view, and Fig. 5 a side elevation of the cell shown in Fig. 3. Fig. 6 is a side elevation of the zinc, or positive, element of said cell, and Fig. 7 an end elevation of said positive element. Fig. 8 a longitudinal elevation, partly in section, of a multiple cell voltaic battery embodying the modified form of cell shown in Figs. 3, 4 and 5. Fig. 9 an end elevation of the battery shown in Fig. 8. Fig. 10 is a fragmentary sectional detail of one of the carbon plates of the cell shown in Fig. 3, and of the battery fluid supply orifice leading to the cell shown in said figure. Fig. 11 is a sectional elevation of another modified form of a cell embodying my invention, and Fig. 12 a top plan view of a multiple cell battery having cells of the construction shown in Fig. 11. Fig. 13 is an end elevation of battery-fluid containing tanks, and of mechanism for simultaneously elevating one of said tanks and lowering the other, and Fig. 14 is a top plan view of a series of multiple cell voltaic batteries embodying my invention, of re-enforcing cells located between said multiple cell batteries, of the battery-fluid-containing tanks, of the tank elevating and lowering mechanism shown in Fig. 13, and of battery-fluid connecting devices between said tanks and the said multiple cell batteries and re-enforcing cells.

In a battery invented by me, and for which I have contemporaneously with this application filed an application for Letters Patent, Serial No. 271,210, an element-containing tank or vessel is employed which at one end is provided with a battery fluid supply orifice, and at the other end with a battery fluid escape orifice, and in which the negative elements of said battery are, at or near their upper ends, provided with openings or orifices, and the positive elements of said battery are, at or near their lower ends, provided with openings or orifices, while the glass partitions which separate the couples of the battery contained in said tank or vessel are, at or near their lower ends also provided with openings or orifices, the construction and arrangement of said parts when taken together being such that battery fluid entering the containing tank flows in a serpentine course downwardly and upwardly in contact with the surfaces of and through the openings in the positive and negative elements, and also through the openings in the glass partitions between the couples of the battery, and finally escapes from said tank through the escape orifice mentioned.

It may be premised that in a battery of the form just described, the electro-motive force of the battery is not equal to the aggregate electro-motive force of all of its couples.

In my present invention, a battery is employed in which the battery fluid is, in its flow from cell to cell, caused to traverse or flow through narrow or confined passages, with the result that a high resistance is interposed to the passage of the current through the battery fluid from cell to cell, and that the electro-motive force of the battery is caused to almost equal the aggregate electro-motive force of all of the couples of the battery.

My present invention not only comprehends such a battery as broadly considered gives rise to the above results, but it also includes various details of construction hereinafter described and claimed.

In Fig. 1 of the drawings, A is a containing box or vessel provided with carbon, or other negative, elements B B, and with zinc, or other positive, elements C C. The negative elements are adjusted and contained in the box by being closely fitted into grooves formed in the inner surfaces of its sides and bottom. The positive elements C C are provided with pins or lateral projections F F of rubber or other insulating material, and these elements are caused to stop short of the bottom of the tank A so that an orifice or opening is left at or near their lower ends. The office of the projections F is to keep the positive elements centered by the contact of their projections with the surfaces of the adjoining negative elements B B. The negative elements B B are, at or near their upper ends, provided with openings or orifices.

A battery supply pipe D, of suitable material, connects with the opening at the top of the first negative element of the battery. A rubber, or other tube E, of suitable length and diameter, connects with the escape orifice at or near the top of the second negative element of the first couple, and with the orifice at or near the top of the first negative element of the second couple. Each of the couples of the battery is in like manner connected by a tube, and the last couple of the battery is provided with a battery escape orifice, or tube D'. The positive and negative elements of the battery are connected in the usual manner by wires G G.

In the operation of a battery of the construction described, it will be understood that the battery fluid, which is supplied through the pipe D, will flow first downwardly and then upwardly through the first cell of the battery, and then through the rubber or other tube connecting the first with the second cell, and again downwardly and upwardly through the second cell, and in like manner throughout the cells of the battery. It will be evident that the diameter of the tubes E may be regulated so as to permit of the necessary flow of battery fluid through the battery, and so as, at the same time, to sufficiently increase the resistance between the couples of the battery as to result in the generation by said battery of a current nearly equal in force to the aggregate electro-motive force of the current generated in all the cells.

It will also be understood that in a battery of the character described, the continual flow of battery fluid through the cells will occasion the continued presentation of new particles of said fluid to the elements thereof; will also occasion the brushing off of such hydrogen globules as may have collected upon the negative element; will likewise, to a large extent, prevent the polarization of the negative element; and will moreover maintain the efficiency of the battery.

The battery fluid may be supplied to this battery through the pipe D, from an elevated reservoir, and the fluid escaping through the pipe D', may be collected in a reservoir situated upon a level lower than that occupied by the cells of the battery. When the elevated fluid-reservoir at the feeding end of the battery has emptied itself and the fluid-reservoir at the other end has become filled, the first named reservoir may be lowered so as to occupy a plane lower than that occupied by the cells of the battery, and the second named reservoir may be elevated so as to cause the flow of the battery fluid therefrom to and through the battery, in a reverse direction, this operation may be accomplished by devices which are hereinafter described.

My invention is also embodied in the modified construction shown in Figs. 3 to 10 inclusive, in which the cells of the battery are each made up of carbon, or other, plates $A^2 A^2$, which form the sides of the cells and constitute the negative elements thereof, and of a zinc or other plate $B^2$, constituting the positive element of the same, said plate $B^2$ being provided upon its sides with projections $F^2 F^2$, of rubber or of other non-conducting material. The carbon plates $A^2 A^2$ are at or near their upper ends, respectively provided alternately with battery fluid supply openings $C^2$ and with battery fluid escape openings $D^2$. $G^2$ is a rubber strip interposed, at the edges, and along the ends and bottom, between the carbon plates $A^2$. The plates are, by rubber bands $E^2 E^2$, or by other devices, bound together and in close contact with the rubber strip $G^2$, so as to thereby form a liquid tight cell or compartment. The positive element $B^2$ is, at its lower end, and at points near each of its sides, supported upon blocks $H^2$, of rubber or other suitable material, in such manner that an opening or orifice is formed at or near the lower end of said positive element. The arrangement and construction of said parts is such that the battery fluid supplied through the orifice $C^2$ will flow downwardly in the cell which it enters, through the orifice formed in, or at or near the lower end of, the positive element $B^2$, and then upwardly seeking to rise to its own level in the supply tank, and then out through the escape opening $D^2$. The office of the projections $F^2 F^2$ is to center the positive element in the carbon cup or negative element.

A multiple cell battery, in which the individual cells are formed as above described, may be made by combining said cells in the arrangement shown in Fig. 8, by providing the first cell of the battery with a battery supply orifice $M^2$, and the last cell of the battery with a battery escape orifice $N^2$, and by coupling said cells together by a rubber, or other, hose or pipe M.

In order to more firmly hold the parts in their proper positions and bind the whole together, I place blocks $I^2 I^2$ between the cells of the battery and blocks $J^2 J^2$, at the respective ends of the battery, and tie the structure together by the rods $K^2 K^2$, extending the entire length of the battery and the ends of which are equipped with screw nuts $L^2 L^2$.

The cells of the battery shown in Fig. 8 are coupled together, in the usual manner, by wires $O^2 O^2$. The neighboring cells of the battery shown in the drawings, have their adjacent sides, which are composed of carbon plates forming the negative elements of the battery, separated by spaces so that atmospheric air may readily come into contact with them, with the result that the collection of hydrogen gas upon the inner surfaces of said cells, and the consequent polarization of said negative elements, is, to a large degree, prevented.

A modified form of cell, shown in Fig. 11, consists in a plate $A^3$, formed of carbon, or of other material suitable for the formation of the negative element of the battery, and of the plate $B^3$, of zinc, or of other material suitable for the formation of the positive element of the battery. A rubber, or other, strip $C^3$, is, at or near the edge of these plates, and at their ends and bottoms, interposed between them and they are bound together, in close contact with said strip $C^3$, by rubber bands $F^3 F^3$, or by other fit devices. The plate $A^3$, is, at or near its top, provided with a battery fluid supply orifice $D^3$, and the plate $B^3$, is, at or near its bottom, provided with a battery fluid escape orifice $E^3$.

In Fig. 12 a multiple cell battery is represented, which is composed of cells such as are shown in Fig. 11, said cells being connected with each other by rubber tubes $H^3 I^3$. The battery is provided with a fluid supply pipe $D^3$, and a fluid escape pipe $D^6$. Between the positive and negative elements of adjoining cells forming this battery are interposed metallic blocks $G^3 G^3$ to form circuit connections.

In Fig. 14 there is shown a series of multiple cell batteries $A^4 A^4 A^4$, embodying my invention, and a series of reservoirs, or as I term them, re-enforcing cells $B^4 B^4$, interposed between said batteries. These batteries and re-enforcing cells, have fluid supply pipes or tubes $D^4 D^4$ and fluid escape pipes or tubes $C^4 C^4$. The first cell of the first battery of said series is, by a fluid supply pipe $E^4$, connected with a fluid supply reservoir $G^4$, the last cell of the last battery of said series being, by a fluid escape pipe $F^4$, connected with a fluid escape reservoir $H^4$.

The re-enforcing cells $B^4 B^4$, are charged with the chemical substance employed to manufacture the battery fluid, and they may also contain any suitable depolarizing agent,—such, for example, as peroxide of manganese when a battery fluid containing a chloride is employed, or a bichromate when an acid battery fluid is used. In the operation of the devices described, battery fluid, from the reservoir $G^4$, passes into and through the cells of the first multiple cell battery, into and through a re-enforcing cell, and so on through the remaining batteries and re-enforcing cells of the system, the battery fluid being finally discharged from the last battery of the system into a battery receiving reservoir $H^4$. It will be understood that the fluid in its course through the re-enforcing cells, dissolves, and becomes impregnated with, the crystals or substance contained therein, and from which the fluid has originally been made, the strength of said fluid being thus renewed and retained.

It will also be understood that when the reservoir $G^4$ has become emptied, and the reservoir $H^4$ has become filled, the reservoir $G^4$ may be lowered and the reservoir $H^4$ elevated with the result that the battery fluid will be caused again to flow through the battery, but in a direction the reverse of that in which it first flowed. In such manner the operation may be continuously repeated.

It is desirable that in connection with my invention means should be provided for reversing the positions of the two reservoirs, when the one which has for the time being acted as a fluid supplying reservoir, has become exhausted, and the other which has acted as a fluid receiving reservoir, has become filled,—and to such end resort may conveniently be had to a device of the general character depicted in Fig. 13, and which is of the following construction:—

$K^4$ is a frame work, in the top of which is journaled an arbor $k$, upon which are mounted two sprocket wheels $J^4$ and $J^5$ respectively. An endless sprocket chain R runs over the wheel $J^5$ and also over another sprocket wheel $J^6$ at the base of the device. Over the wheel $J^4$ runs a sprocket chain of predetermined length, at the respective ends of which are attached the reservoirs $G^4 H^4$. The required raising and lowering of the reservoirs to carry out the purpose of their provision is effected by manipulation of the chain R.

I do not confine myself to the use of a battery fluid of any particular composition, but I have found that good results may be obtained by a fluid composed of a solution formed of chloride of sodium, bichromate of potash and sulphuric acid.

Having thus described my invention, I claim:—

1. In a voltaic battery cell, in combination, a carbon-cup negative element, means at one side of said cup for the supply of battery fluid thereto, means at the other side of said cup for the escape of said battery fluid therefrom, a positive element, contained and supported in said carbon cup, and, at or near its lower end, provided with an opening or orifice, the construction and arrangement of said parts being such that the battery fluid is permitted to flow into said cup, downwardly and upwardly in contact with the interior surfaces of said cup and the exterior surfaces of said positive element and out of said cup, as specified.

2. In a multiple cell voltaic battery, in combination, a series of two or more couples, each consisting of a carbon cup negative element, means at one side of said cup for the supply of battery fluid thereto, means at the other side of said cup for the escape of said battery fluid therefrom, a positive element, contained and supported in said carbon cup, and, at or near its lower end, provided with an opening or orifice,—means for the supply of battery fluid to the first cup of the series,—means for the escape of said battery fluid from the last cup of said series,—and tubes each extending from the battery fluid escape orifice of one cell to the battery fluid supply orifice of the next cell, as specified.

3. In a voltaic battery, in combination, a cell or cup provided with positive and negative elements, a battery fluid reservoir connected therewith by a supply pipe, a battery fluid discharge pipe leading from said cell, and a re-enforcing cell or reservoir provided with substances from which the battery fluid is made, connected with the battery fluid discharge opening of the first named cell and with the battery fluid supply orifice of the next cell of the series, as specified.

4. In a voltaic battery, in combination, a cell provided with means for the supply of the battery fluid thereto and with means for the escape of the battery fluid therefrom,—positive and negative elements so constructed and arranged as to permit said battery fluid to flow through said cell in contact with said elements,—one or more re-enforcing cells, provided with material from which the battery fluid is formed,—means for the escape of the battery fluid from the first named cell to said re-enforcing cell,—means for the escape of said battery fluid from said re-enforcing cell,—a battery fluid reservoir connected by a pipe, or by other means, with the first cell of said series,—a second battery fluid reservoir connected by a pipe, or by other means, with the last cell of said series,—and means for alternately at will raising either reservoir and simultaneously lowering the other, substantially as set forth.

In testimony that I claim the foregoing as my invention I have hereunto signed my name the 2d day of April A. D. 1888.

ISIDOR KITSEE.

Witnesses:
 WM. C. STRAWBRIDGE,
 F. NORMAN DIXON.